US012189826B2

(12) United States Patent
Karstens (10) Patent No.: US 12,189,826 B2
(45) Date of Patent: Jan. 7, 2025

(54) AUTOMATIC DEVALUATION OF COMPROMISED DATA

(71) Applicant: INTERNATIONAL BUSINESS MACHINES CORPORATION, Armonk, NY (US)

(72) Inventor: Christopher Kent Karstens, Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 18/048,477

(22) Filed: Oct. 21, 2022

(65) Prior Publication Data

US 2024/0135041 A1 Apr. 25, 2024
US 2024/0232437 A9 Jul. 11, 2024

(51) Int. Cl.
*G06F 21/00* (2013.01)
*G06F 16/27* (2019.01)
*G06F 21/64* (2013.01)

(52) U.S. Cl.
CPC ............. *G06F 21/64* (2013.01); *G06F 16/27* (2019.01)

(58) Field of Classification Search
None
See application file for complete search history.

(56) References Cited

U.S. PATENT DOCUMENTS

| 7,076,622 | B2* | 7/2006 | Hsu | G06F 11/1096 |
| | | | | 711/170 |
| 9,792,431 | B1 | 10/2017 | Dalal | |
| 10,303,877 | B2 | 5/2019 | Roguine | |
| 10,353,784 | B2* | 7/2019 | Kashyap | G06F 3/065 |
| 2007/0183224 | A1* | 8/2007 | Erofeev | G06F 11/1456 |
| | | | | 365/189.05 |
| 2010/0131468 | A1* | 5/2010 | Thakore | G06F 16/2365 |
| | | | | 707/624 |
| 2021/0365588 | A1 | 11/2021 | Lu | |

FOREIGN PATENT DOCUMENTS

EP 3374922 B1 8/2019

OTHER PUBLICATIONS

"Understanding and Selecting Data Masking Solutions: Creating Secure and Useful Data." Securosis, LLC, Aug. 10, 2012, 33 pgs.
Abouelmehdi, et al. "Big Data Security and Privacy in Healthcare: A Review", Procedia Computer Science 113, 2017, 8 pgs.
Kasturi, "Some Aspects of Test Data Management Strategy." 2020 IEEE International Conference on Computing, Power and Communication Technologies (GUCON), IEEE, Oct. 2-4, 2020, 7 pgs.

(Continued)

*Primary Examiner* — Andrew J Steinle
(74) *Attorney, Agent, or Firm* — IBM Patents+ Team (57) ABSTRACT

A processor may identify that a new data entry is being generated. The processor may identify that the new data entry is associated with a replica data entry threshold. The replica data entry threshold may indicate a minimum amount of replica data entries to generate. The replica data entries may be substantially similar to the new data entry. The processor may generate an amount of replica data entries. The processor may store the new data entry and the amount of replica data entries in a repository.

20 Claims, 4 Drawing Sheets

(56) References Cited

OTHER PUBLICATIONS

Luo, et al, "A Data Hiding Approach for Sensitive Smartphone Data", Proceedings of the 2016 ACM International Joint Conference on Pervasive and Ubiquitous Computing, Sep. 2016, 12 pgs.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATIC DEVALUATION OF COMPROMISED DATA

BACKGROUND

The present disclosure relates generally to the field of data security, and more specifically to storing data that devalues the data when compromised.

Often times, nefarious actors are able to access confidential information because the information is too easily identified. For instance, the information may be labeled with a user identification (ID) that is easily identifiable to the user, or the information is incorporated into a database with a small amount of other data such that the information is easily identifiable.

SUMMARY

Embodiments of the present disclosure include a method, computer program product, and system for storing data that devalues the data when compromised. A processor may identify that a new data entry is being generated. The processor may identify that the new data entry is associated with a replica data entry threshold. The replica data entry threshold may indicate a minimum amount of replica data entries to generate. The replica data entries may be substantially similar to the new data entry. The processor may generate an amount of replica data entries. The processor may store the new data entry and the amount of replica data entries in a repository.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data security, and more specifically to storing data that devalues the data when compromised. While the present disclosure is not necessarily limited to such applications, various aspects of the disclosure may be appreciated through a discussion of various examples using this context.

Often times, nefarious actors are able to access confidential information because the information is too easily identified. For instance, the information may be labeled with a user identification (ID) that is easily identifiable to the user, or the information is incorporated into a database with a small amount of other data such that the information is easily identifiable.

Accordingly, discussed herein is a solution for automatically devaluing compromised data. Said solution, by way of a processor, mixes valid and invalid data (e.g., sometimes referred to as records, data records, replica data, etc.) together, so if/when the data is compromised, a nefarious actor cannot determine which data is valid and which is not, as there are too many date entries/records to sift through. Thus providing the nefarious actor with less clues as to find the (confidential) data via electronic and/or human means.

As an example, suppose an operator is generating a new record (e.g., data entry) for a new patient and that 999,999 records already exist within a patient database/repository. In such an example, the operator and the system used for generating the new record have no idea which records are valid or invalid (e.g., 1 record of the 999,999 may be valid, all records may be valid, or any amount in-between).

Furthering the example, the operator types in new patient data, making the new patients data record number 1,000,000. The operator further types in "no more than" 0.01% valid (i.e., "at least" 99.99% invalid); the operator clicks "submit".

Accordingly, the system identifies that 99.99% of 1,000,000 is 999,900. The system then randomly selects a number equal to or greater than 999,900; for sake of this example, say 1,254,371. The system then generates 1,254,371 invalid records (where the invalid records are substantially similar to the valid record associated with the new patient data [e.g., if the new patient data is an x-ray, each of the generated 1,254,371 invalid records could have a computer generated skewed image of the x-ray, such as incorrect fractures, incorrect graphical elements, etc.]).

In some embodiments, the system further randomly selects a number between 1 and 1,254,372 total records to add to the patient database/repository; for the sake of this example, say 785,397. Each record is then keyed off a guaranteed unique random identifier. For instance, instead of customer ID x, y, z one would have:

Customer ID=A73718GNQUY63D
Customer ID=1Z22ET50GR
Customer ID=7TX4352G362736S232716

Accordingly, the system inserts 785,397 invalid records keyed on the Customer ID. The system also inserts the one (1) valid record from associated with the new patient data keyed on Customer ID. The operator is then prompted that Customer ID=1Z22ET50GR has been created as the valid record (e.g., new data entry).

In such an embodiment, as presented by the example, the operator does not know how many records were created, or the order in which the records were added. Further, a nefarious actor cannot call the operator on the telephone and get this information as the operator simply does not know it. The percent valid (e.g., replica data entry threshold) the operator types in is additionally not stored, and the final customer ID prompt value is not stored. In some embodiments, the percent valid can be automatically determined by the system based on the sensitivity of the data to be stored, e.g., confidential information is set to a lower percent valid compared to generally available information, etc.

In some embodiments, the nefarious actor could compromise all the records repeatedly over time and compare new versus old records/data. However, with random keyed inserts, not knowing how many updates have been made, and not knowing the percent valid values, the nefarious actor is prevented from finding any clues about the valid records/data.

It is noted that a limitation to this approach is updating invalid records (e.g., replica data entries). A valid customer with a valid record will update their record over time, e.g., with new dates they came in for treatment, updated credit card info, new payments, new x-ray images, etc. Ideally, however, the proposed solution generates more invalid records upon updates or changes the information on previously generated invalid records in accordance with the information updated in the valid record (e.g., address information is updated in the valid record and accordingly false addresses are updated in the invalid records).

In one embodiment, invalid records could be automatically updated at intervals typical of a real human customer (e.g., a dental x-ray image uploaded Mar. 1, 2021 and a follow-up dental x-ray image uploaded Mar. 16, 2022).

As such, the solution presented herein overwhelms nefarious actors with ultra-realistic invalid records/data entries. The nefarious actors would be more likely to win the lottery than pick a valid record/data entry. To make use of the compromised (e.g., stolen) data the nefarious actors would need to compromise a second resource (e.g., banking statements). Thus, without a way to identify valid from invalid records it makes it more difficult to sell or use the compromised data. For example, using a stolen record to initiate a bank loan or apply for a credit card. While a bank may permit a faulty application or two, the bank will not permit a billion or a trillion faulty applications; it's not worth the time or effort of the nefarious actors and they will move on to easier targets. Further, the solution provided herein requires the nefarious actors to spend more time and more effort, which exposes them to more risk of getting caught.

It is noted that various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

Figure 1:
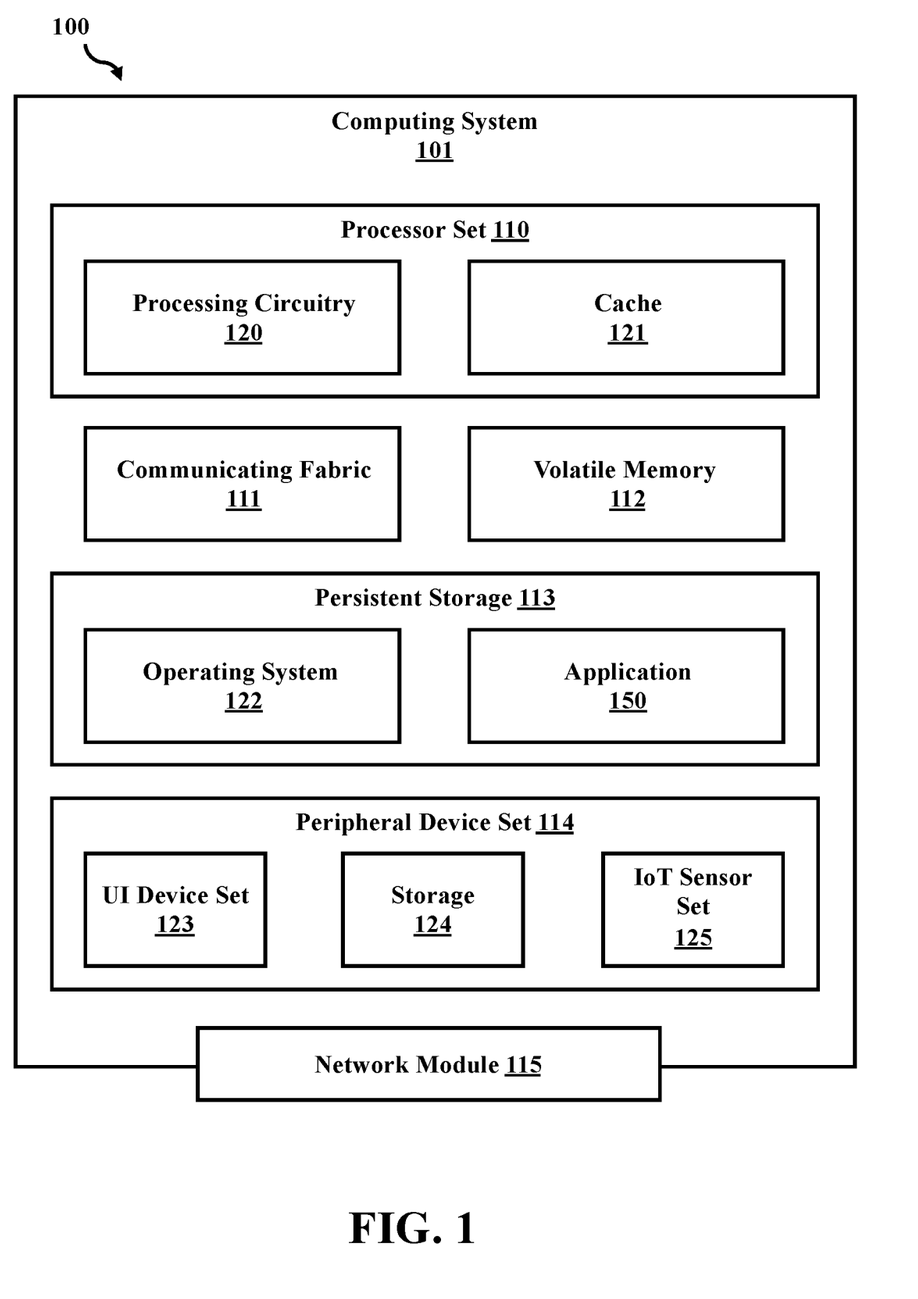
FIG. 1 depicts a block diagram illustrating an embodiment of a computer system and the components thereof, upon which embodiments described herein may be implemented in accordance with the present disclosure.

Referring now to FIG. 1, illustrated is a block diagram describing an embodiment of a computing system 101 within in a computing environment, which may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. It should be appreciated that FIG. 1 provides only an illustration of one implementation of a computing system 101 and does not imply any limitations regarding the environments in which different embodiments may be implemented. In general, the components illustrated in FIG. 1 may be representative of an electronic device, either physical or virtualized, capable of executing machine-readable program instructions.

Embodiments of computing system 101 may take the form of a desktop computer, laptop computer, tablet computer, smart phone, smart watch or other wearable computer, mainframe computer, server, quantum computer, a non-conventional computer system such as an autonomous vehicle or home appliance, or any other form of computer or mobile device now known or to be developed in the future that is capable of running a program 150, accessing a network 102 or querying a database, such as remote database 130. Performance of a computer-implemented method executed by a computing system 101 may be distributed among multiple computers and/or between multiple locations. Computing system 101 may be located as part of a cloud network, even though it is not shown within a cloud in FIGS. 1-2. Moreover, computing system 101 is not required to be in a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Computer readable program instructions can be loaded onto computing system 101 to cause a series of operational steps to be performed by processor set 110 of computing system 101 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as application(s) 150 comprising one or more running processes, services, programs and installed components thereof. For example, program instructions, processes, services and installed components thereof may include the components and/or sub-components of the system 300 as shown in FIG. 3.

Communication fabric 111 may refer to signal conduction paths that may allow the various components of computing system 101 to communicate with each other. For example, communications fabric 111 can provide for electronic communication among the processor set 110, volatile memory 112, persistent storage 113, peripheral device set 114 and/or network module 115. Communication fabric 111 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computing system 101, the volatile memory 112 is located in a single package and can be internal to computing system 101, but, alternatively or additionally, the volatile memory 112 may be distributed over multiple packages and/or located externally with respect to computing system 101. Application 150, along with any program(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computing system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computing system 101. For example, via an input/output (I/O interface). Data communication connections between the peripheral devices and the other components of computing system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as goggles, headsets and smart watches), keyboard, mouse, printer, touchpad, game controllers, and haptic feedback devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and components acting as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet-of-Things applications. For example, a sensor may be a temperature sensor, motion sensor, infrared sensor or any other type of known sensor type.

Network module 115 may include a collection of computer software, hardware, and/or firmware that allows computing system 101 to communicate with other computer systems through a network 102, such as a LAN or WAN. Network module 115 may include hardware, such as modems or Wi-Fi signal transceivers, software for packetizing and/or de-packetizing data for communication network transmission, and/or web browser software for communicating data over the network. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computing system 101 from an external computer or external storage device through a network adapter card or network interface included in network module 115.

Figure 2:
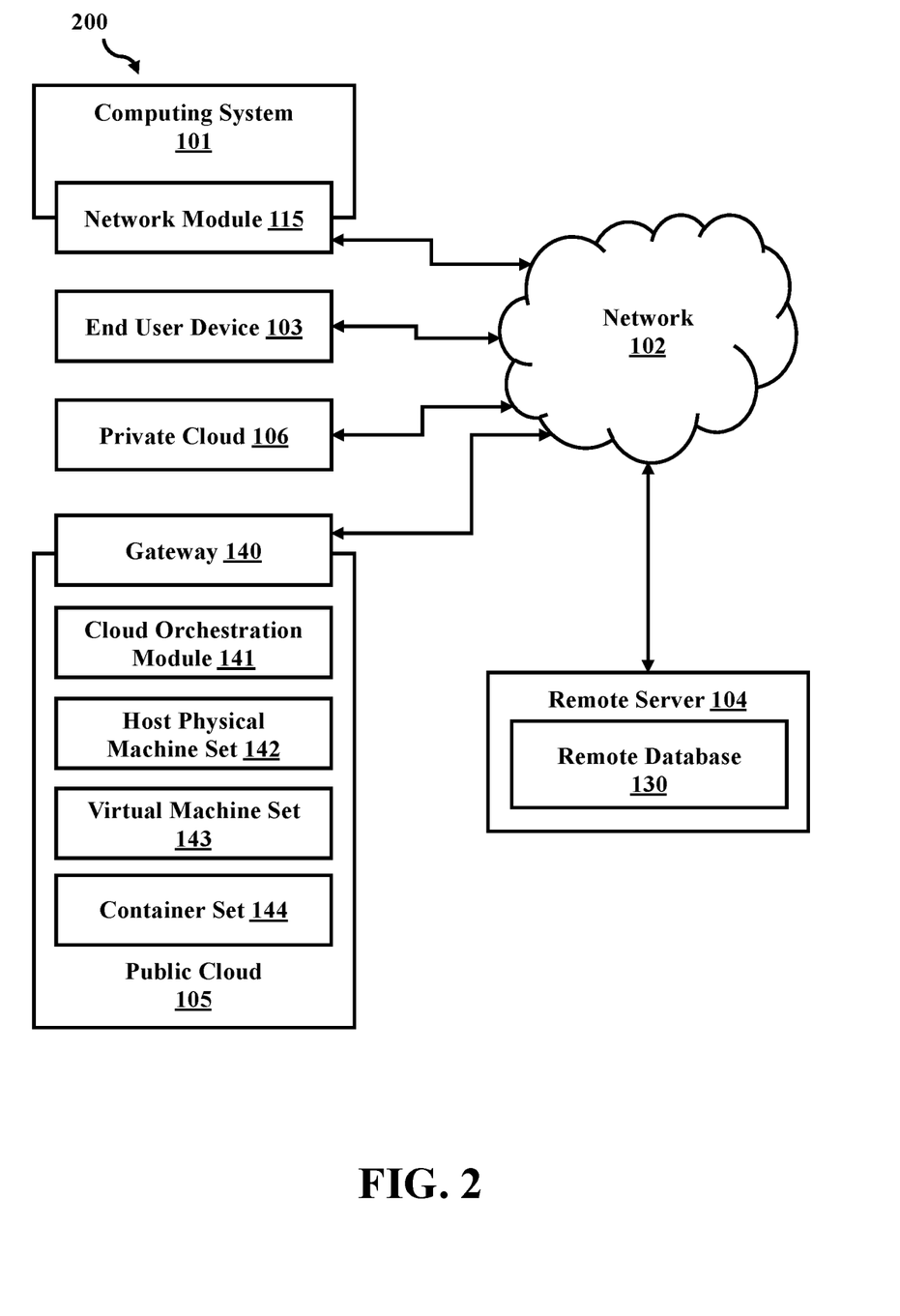
FIG. 2 depicts a block diagram illustrating an extension of the computing system environment of FIG. 1, wherein the computer systems are configured to operate in a network environment (including a cloud environment), and perform methods described herein in accordance with the present disclosure.
Figure 3:
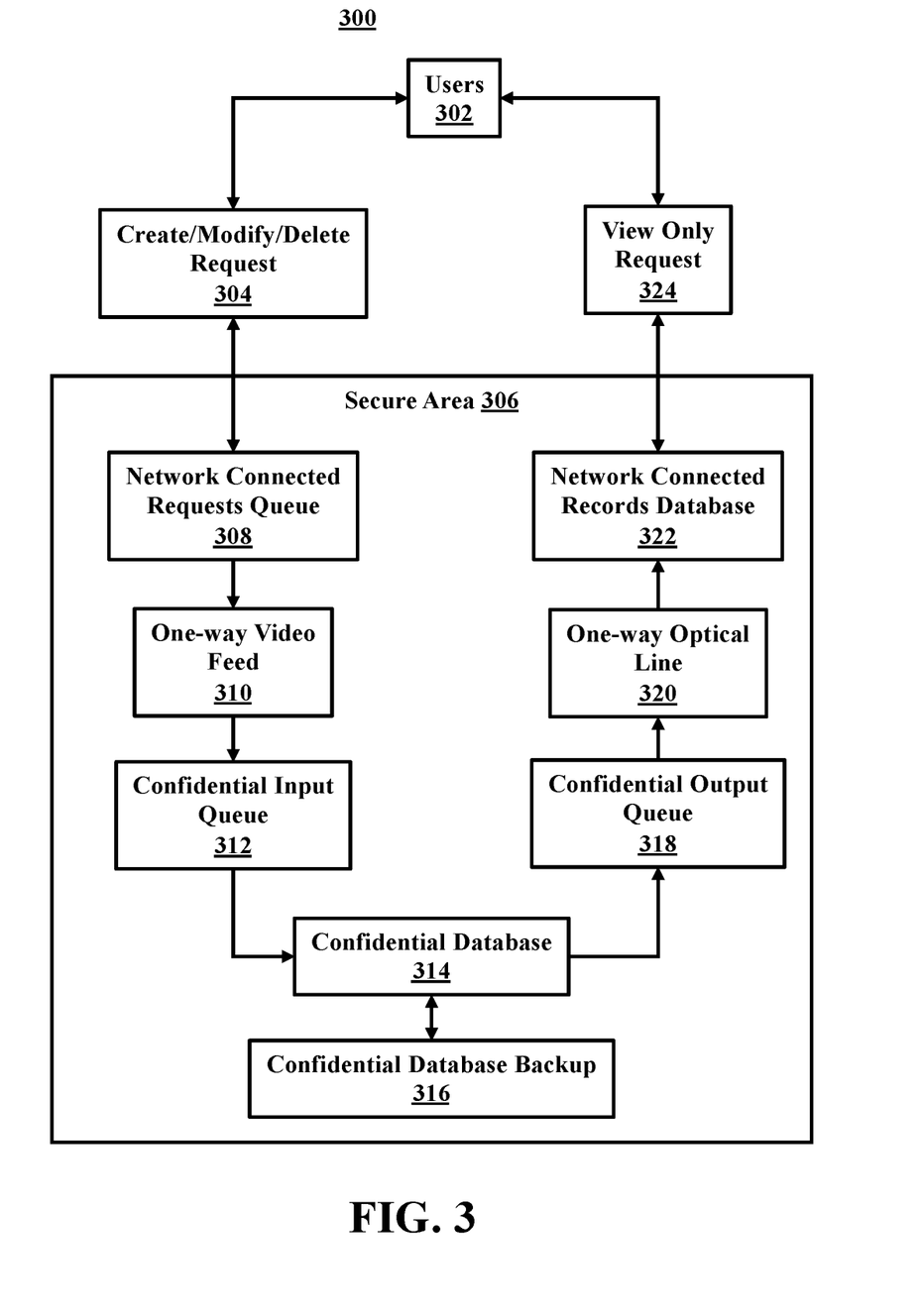
FIG. 3 illustrates a block diagram of an example system for storing data that devalues the data when compromised, in accordance with aspects of the present disclosure.

Continuing, FIG. 2 depicts a computing environment 200 which may be an extension of the computing environment 100 of FIG. 1, operating as part of a network. In addition to computing system 101, computing environment 200 can include a network 102 such as a wide area network (WAN) (or another type of computer network) connecting computing system 101 to an end user device (EUD) 103, remote server 104, public cloud 105, and/or private cloud 106. In this embodiment, computing system 101 includes processor set 110 (including processing circuitry 120 and cache 121), communication fabric 111, volatile memory 112, persistent storage 113 (including operating system 122 and program(s) 150, as identified above), peripheral device set 114 (including user interface (UI), device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

Network 102 may be comprised of wired or wireless connections. For example, connections may be comprised of computer hardware such as copper transmission cables, optical transmission fibers, wireless transmission, routers, firewalls, switches, gateway computers and/or edge servers. Network 102 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computing system 101) and may take any of the forms discussed above in connection with computing system 101. EUD 103 may receive helpful and useful data from the operations of computing system 101. For example, in a hypothetical case where computing system 101 is designed to provide a recommendation to an end user, this recommendation may be communicated from network module 115 of computing system 101 through WAN 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, the historical data may be provided to computing system 101 from remote database 130 of remote server 104.

Public cloud 105 may be any computing systems available for use by multiple entities that provide on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through network 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 150 running in them. An application 150 running on an operating system 122 can utilize all resources of that computer, such as connected devices, files and folders, network shares, CPU power, and quantifiable hardware capabilities. Applications 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with network 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

Referring now to FIG. 3, illustrated is a block diagram of an example system 300 for storing data that devalues the data when compromised, in accordance with aspects of the present disclosure.

As depicted, the system 300 includes users 302, a create/modify/delete request 304, a secure area 306, a network connected requests queue 308, a one-way video feed 310, a confidential input queue 312, a confidential database 314, a confidential database backup 316, a confidential output queue 318, a one-way optical line 320, a network connected records database 322, and a view only request 324.

In some embodiments, one or more of the users 302 generates and/or submits create/modify/delete request 304. The create/modify/delete request 304 is then received by the network connected requests queue 308 of the secure area 306. In some embodiments, the secure area 306 is a physically secure area, e.g., room with secure access, etc.

In some embodiments, information/data associated with (e.g., a picture of, data of, etc.) the create/modify/delete request 304 is communicated from the network connected requests queue 308 to the confidential input queue 312 via the one-way video feed 310. The confidential input queue 312 then communicates with the confidential database 314 (which may also be referred to as a repository), which stores the information/data associated with the create/modify/delete request 304, and which is the source that identifies valid and invalid records. It is noted that it is essential that nefarious actors never access this information (e.g., the identity of valid/invalid records), which is why the confidential database 314 is isolated from outside networks (e.g., outside the secure area 306). In some embodiments, the confidential input queue 312 may also generate one or more replica information/data that is substantially similar to the information/data associated with the create/modify/delete request 304.

In some embodiments, the confidential database 314 additionally communicates with the confidential database backup 316, which may also store the information/data associated with the create/modify/delete request 304. In some embodiments, the confidential database 314 communicates with the confidential output queue 318, which may randomly order the information/data associated with the create/modify/delete request 304 and the replica information/data. The confidential output queue 318 then communicates with the network connected records database 322 via the one-way optical line 320. In some embodiments, the network connected records database 322 sends the view only request 324 to the users 302.

It is noted that in some embodiments, that all components above the network connected requests queue 308 and the network connected records database 322 can be reached via a network from outside the secure area 306, and that all components below cannot be reached via the network from outside the secure area 306. It is further noted that the network connected records database 322 can be reached via a network from outside the secure area 306 because is not the source that identifies valid and invalid records. Moreover, the network connected records database 322 is reachable from outside networks as it is anticipated that the network connected records database 322 will be repeatedly compromised by nefarious actors.

As an implementation example of the system 300, implementation video capture cards may be used, and one server (e.g., the network connected requests queue 308) can contain one or more video capture cards. For instance, on the one networked queue server there may be eight 4K output video cards, and eight video outputs are directly cabled to non-networked confidential server eight video capture card inputs (e.g., of the confidential input queue 312).

In this example, the video solution (e.g., HDMI, DisplayPort, etc.) and/or the video solution cabling only permits one way signals (e.g., the one-way video feed 310). That is, the cable does not have a return wire. Thus, these physical restrictions prevent tampering and accidental configuration mistakes. This is similar to the optical line connection (e.g., the one-way optical line 320) where the lack of a receiver element physically prevents receiving signals.

In some embodiments, video output may match video input captured. For instance, 4K at 360 frames per second output is captured at 4K at 360 frames per second. Further, video output (e.g., of the information associated with the create/modify/delete request 304) may be raw text/graphics (e.g., x-ray images, confidential information, etc.) and/or encoded text/graphics. In some embodiments, encoded text/graphics can be smart barcodes.

Such encoded data continues to work even if a portion of the barcode is not received correctly. This can be helpful where networked-style acknowledgements are minimal, slow, or not present at all. For example, instead of sending raw data 10 times to ensure successful communication, the smart encoded data can be just as successful when sent 5 times (e.g., information is sent more than once/redundantly to ensure valid data/information is correctly identified).

In some embodiments, one server can contain one or more optical networking outputs (e.g., the network connected records database 322 with the one-way optical line 320). For instance, on one confidential server (e.g., the network connected records database 322) there are eight optical networking output only cards, where the eight optical output only cards are directly cabled to the queued server (e.g., the confidential output queue 318) eight optical input only cards.

It is noted that the use of video input only to the confidential server(s) (e.g., the network connected requests queue 308, the network connected records database 322, and/or the confidential database 314) severely restricts control of the server(s). That is, a user (of users 302) cannot security shell protocol (SSH) to the confidential server(s) over video input because the software managing the video input of the system 300 on the confidential server(s) does not support it.

With the physical "one-way" restrictions of the video input and optical output a nefarious actor would need physical access (e.g., a local keyboard, serial port, etc.) to the confidential server to compromise it. Placing the confidential server in a secure location (e.g., secure area 306) greatly reduces physical access. In cloud/data center environments secure cages are generally available. These cages are off the main floor in their own dedicated locked space.

In some embodiments, backups (e.g., confidential database backup 316) of the confidential server (e.g., confidential database 314) can be automatically performed in the same room. Backups can be physically hand-carried to other locations for disaster recovery purposes. For example, hand-carried tape backups moved to and stored at three different physical locations.

In some embodiments, security and compliance scans can be performed by an operator (e.g., one of the users 302) with physical access to the confidential server(s). For example, updated virus scan signatures can be installed locally on the confidential server(s) by the operator with physical access.

It is noted that the confidential server(s) must not receive inputs from a traditional network (e.g., IP ethernet). There are many alternate ways to communicate in one direction, for instance, a camera (e.g., taking a picture of something nearby), an electronic (e.g., video/audio signal), an optical light (e.g., fiber networking), a microphone (e.g., audio signal), etc. In such an embodiment, there is no way to SSH through a camera taking a picture of a monitor because the software managing the camera pictures does not support it (e.g., the one-way video feed 310 is presenting a video of the new entry or confidential information to the confidential input queue 312 and there is no direct communication of the actual new entry or confidential information to confidential input queue 312). Put another way, there is no way to SSH from the queue server (e.g., network connected requests queue 308 to the confidential server (e.g., confidential database 314) over optical networking (e.g., the one-way video feed 310 and/or the one-way optical line 320) because the confidential server does not physically have an optical networking receiver.

In some embodiments, the system 300 exchanges data with no acknowledgments. Such embodiment may work as follows:

1) Repeat transmissions, where there is a repeat of the same transmission 10 times to reduce errors. The logic on a receiving side is expecting 10 times total but realizes it may only receive 3 times when network conditions are extremely poor.

2) Scale queue side and confidential side. Ten queue side servers present the exact same image to ten confidential side servers at the exact same time. The confidential side servers communicate with each other and agree they have received the input. Even if three queue side servers fail and go offline, the message is still delivered via the other seven queue side servers. The confidential side can send an "input received" signal to the queue side via optical line. It is noted that that although servers and a number of servers are discussed throughout this example, that the databases and queues depicted in system 300 may be the servers and may not necessarily depict all the servers described in this example or other examples.

3) Use network connected queue server monitor/display to provide "input received" back to the confidential server. For example, a message is displayed stating a particular record has been updated. If the confidential server does not see this message via camera it can retry at a later time.

4) Optical lines are well known and very fast, whereas monitor speed is lesser known. Modern monitors can display at 360 frames per second, which is very fast. In other words, the network side queue server can present 360 screens of different information per second. If this is not a fast enough input, the system 300 can scale up groups of servers. For example, multiple groups of network side queue servers with each group inputting a different monitor/display image/graphic at the same instant in time.

Figure 4:
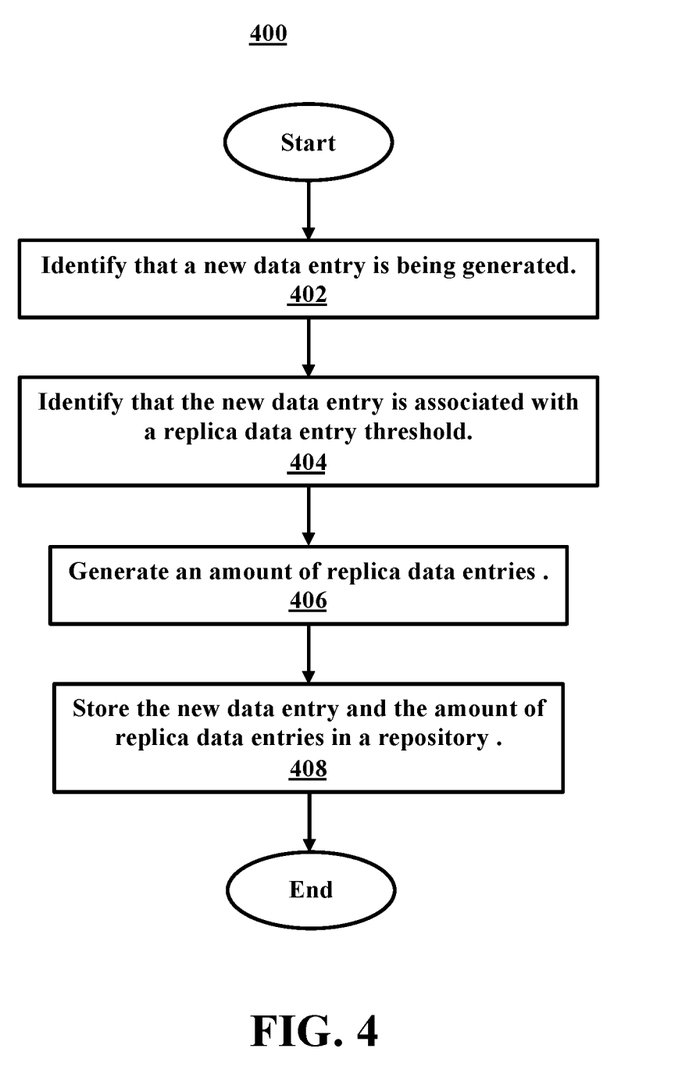
FIG. 4 illustrates a flowchart of an example method for storing data that devalues the data when compromised, in accordance with aspects of the present disclosure.

Referring now to FIG. 4, illustrated is a flowchart of an example method 400 for storing data that devalues the data when compromised, in accordance with aspects of the present disclosure. In some embodiments, the method 400 may be performed by a processor (e.g., of the system 300 of FIG. 3, etc.).

In some embodiments, the method 400 begins at operation 402, where the processor may identify that a new data entry is being generated. In some embodiments, the method 400 proceeds to operation 404, where the processor may identify that the new data entry is associated with a replica data entry threshold (e.g., "no more than" 0.01% valid, etc.). In some embodiments, the replica data entry threshold may indicate a minimum amount of replica data entries to generate, and the replica data entries may be substantially similar to the new data entry (e.g., the replica data entries may be computer generated images that are augments of the new data entry, for instance a new data entry may be a picture of the sky at night and a replica data entry may be the same picture but computer augmented to represent the daytime).

In some embodiments, the method 400 proceeds to operation 406, where the processor may (randomly) generate an amount of replica data entries. In some embodiments, the method 400 proceeds to operation 408, where the processor may store the new data entry and the amount of replica data entries in a repository (e.g., a confidential database, server, etc.). In some embodiments, after operation 408, the method 400 may end.

In some embodiments, discussed below, there are one or more operations of the method 400 not depicted for the sake of brevity and which are discussed throughout this disclosure. Accordingly, in some embodiments, generating the amount of replica data entries includes the processor selecting, randomly, a number equal to or above the minimum amount of replica data entries (e.g., 99.99% of 1,000,000 is 999,900, so selecting any value above 999,900). This allows for the replica data entry threshold to be at least sufficiently met.

In some embodiments, the processor selects, randomly, a number between one and the number equal to or above the minimum amount of replica data entries and adds an amount of replica data entries associated to the number between one and the number equal to or above the minimum amount of replica data entries to the repository. It is noted that the randomness precludes a user who is requesting the new data entry generation from knowing the amount of replica entries and/or the location of the (valid) new data entry.

In some embodiments, each replica data entry of the replica data entries is associated with a customer identification. That is, the new data entry and all the replica data entries are associated with a customer identification, such that each entry appears to be associated with one customer or user. Thus precluding a nefarious actor for being able to discern which information/data entry is valid in relation to the customer or user.

In some embodiments, generating the amount of replica data entries includes the processor configuring (automatically) the repository to be untethered from a direct network connection. In such an embodiment, the untethered connection inhibits the repository from being compromised via wireless means. In some embodiments, a device associated with the repository (e.g., a camera, a monitor, etc.) receives (e.g., as sent by the processor), one or more images associated with the new data entry on one directional feed (e.g., video feed, optical line, etc.).

In some embodiments, the processor (or by the device associated with the repository) generates, at random times, one or more batches of new data entries with new replica data entries. The processor further inserts the new replica data entries (and/or new entries) of the one or more batches into the repository. That is, the processor continues to update replica data so as to not make it look stale, which would in turn highlight the valid entry as it would update over time (e.g., after another follow-up the new/valid entry is updated with a new time stamp, address of user, etc.).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for storing data that devalues the data when compromised, the system comprising:
   a memory; and
   a processor in communication with the memory, the processor being configured to perform operations comprising:
   identifying that a new data entry is being generated;
   identifying that the new data entry is associated with a replica data entry threshold, wherein the replica data entry threshold indicates a minimum amount of replica data entries to generate, and wherein the replica data entries are substantially similar to the new data entry;
   generating an amount of replica data entries; and
   storing the new data entry and the amount of replica data entries in a repository.

2. The system of claim 1, wherein generating the amount of replica data entries includes:
   selecting, randomly, a number equal to or above the minimum amount of replica data entries.

3. The system of claim 2, wherein the processor is further configured to perform operations comprising:
   selecting, randomly, a number between one and the number equal to or above the minimum amount of replica data entries; and
   adding an amount of replica data entries associated to the number between one and the number equal to or above the minimum amount of replica data entries to the repository.

4. The system of claim 3, wherein each replica data entry of the replica data entries is associated with a customer identification.

5. The system of claim 1, wherein generating the amount of replica data entries includes:
   configuring the repository to be untethered from a direct network connection.

6. The system of claim 5, wherein the processor is further configured to perform operations comprising:
   receiving, by a device associated with the repository, one or more images associated with the new data entry on one directional feed.

7. The system of claim 6, wherein the processor is further configured to perform operations comprising:
   generating, at random times, one or more batches of new data entries with new replica data entries; and
   inserting the new replica data entries of the one or more batches into the repository.

8. A computer-implemented method for storing data that devalues the data when compromised, the method comprising:
   identifying, by a processor, that a new data entry is being generated;
   identifying that the new data entry is associated with a replica data entry threshold, wherein the replica data entry threshold indicates a minimum amount of replica data entries to generate, and wherein the replica data entries are substantially similar to the new data entry;
   generating an amount of replica data entries; and
   storing the new data entry and the amount of replica data entries in a repository.

9. The computer-implemented method of claim 8, wherein generating the amount of replica data entries includes:
   selecting, randomly, a number equal to or above the minimum amount of replica data entries.

10. The computer-implemented method of claim 9, further comprising:
    selecting, randomly, a number between one and the number equal to or above the minimum amount of replica data entries; and
    adding an amount of replica data entries associated to the number between one and the number equal to or above the minimum amount of replica data entries to the repository.

11. The computer-implemented method of claim 10, wherein each replica data entry of the replica data entries is associated with a customer identification.

12. The computer-implemented method of claim 8, wherein generating the amount of replica data entries includes:
    configuring the repository to be untethered from a direct network connection.

13. The computer-implemented method of claim 12, further comprising:
    receiving, by a device associated with the repository, one or more images associated with the new data entry on one directional feed.

14. The computer-implemented method of claim 13, further comprising:
    generating, at random times, one or more batches of new data entries with new replica data entries; and
    inserting the new replica data entries of the one or more batches into the repository.

15. A computer program product for storing data that devalues the data when compromised comprising a computer readable storage medium having program instructions embodied therewith, the program instructions executable by a processor to cause the processor to perform operations, the operations comprising:
    identifying that a new data entry is being generated;
    identifying that the new data entry is associated with a replica data entry threshold, wherein the replica data entry threshold indicates a minimum amount of replica data entries to generate, and wherein the replica data entries are substantially similar to the new data entry;
    generating an amount of replica data entries; and
    storing the new data entry and the amount of replica data entries in a repository.

16. The computer program product of claim 15, wherein generating the amount of replica data entries includes:
    selecting, randomly, a number equal to or above the minimum amount of replica data entries.

17. The computer program product of claim 16, wherein the processor is further configured to perform operations comprising:
    selecting, randomly, a number between one and the number equal to or above the minimum amount of replica data entries; and
    adding an amount of replica data entries associated to the number between one and the number equal to or above the minimum amount of replica data entries to the repository.

18. The computer program product of claim 17, wherein each replica data entry of the replica data entries is associated with a customer identification.

19. The computer program product of claim 15, wherein generating the amount of replica data entries includes:
    configuring the repository to be untethered from a direct network connection.

20. The computer program product of claim 19, wherein the processor is further configured to perform operations comprising:
    receiving, by a device associated with the repository, one or more images associated with the new data entry on one directional feed.

\* \* \* \* \*